(12) United States Patent
Bozintan et al.

(10) Patent No.: US 9,211,861 B2
(45) Date of Patent: Dec. 15, 2015

(54) AIRBAG DEPLOYMENT DEVICE

(75) Inventors: Vasile E. Bozintan, Farmington Hills, MI (US); Jerry B. Moore, Brighton, MI (US); Robert D. Blair, III, Milford, MI (US)

(73) Assignee: Johnson Controls Technology Company, Holland, MI (US)

( * ) Notice: Subject to any disclaimer, the term of this patent is extended or adjusted under 35 U.S.C. 154(b) by 238 days.

(21) Appl. No.: 11/950,817

(22) Filed: Dec. 5, 2007

(65) Prior Publication Data

US 2008/0129021 A1    Jun. 5, 2008

Related U.S. Application Data

(60) Provisional application No. 60/872,971, filed on Dec. 5, 2006.

(51) Int. Cl.
*B60R 21/207* (2006.01)
*B60R 21/217* (2011.01)

(52) U.S. Cl.
CPC .............. *B60R 21/207* (2013.01); *B60R 21/217* (2013.01)

(58) Field of Classification Search
USPC ............ 280/728.2, 730.2, 729; 403/265, 266, 403/269; 411/82.1; 297/216.13
See application file for complete search history.

(56) References Cited

U.S. PATENT DOCUMENTS

| | | | |
|---|---|---|---|
| 5,542,691 A | | 8/1996 | Marjanski et al. |
| 5,752,714 A | | 5/1998 | Pripps et al. |
| 5,799,970 A | | 9/1998 | Enders |
| 5,829,779 A | * | 11/1998 | Nakashima et al. ....... 280/730.2 |
| 6,045,151 A | | 4/2000 | Wu |
| 6,186,534 B1 | * | 2/2001 | Heinz ......................... 280/728.2 |
| 6,422,590 B1 | | 7/2002 | Umezawa et al. |
| 6,612,610 B1 | * | 9/2003 | Aoki et al. .................. 280/730.2 |
| 2003/0042712 A1 | * | 3/2003 | Henderson et al. ........ 280/728.2 |
| 2004/0239081 A1 | | 12/2004 | Tredez |
| 2005/0023803 A1 | | 2/2005 | Kuroe et al. |

FOREIGN PATENT DOCUMENTS

GB    2408722    6/2005

* cited by examiner

*Primary Examiner* — Keith Frisby
(74) *Attorney, Agent, or Firm* — Dickinson Wright PLLC

(57) ABSTRACT

An airbag system for a vehicle seat having an airbag module coupled to a vehicle seat frame by a fastener assembly and substantially surrounded by a force cloth. An isolator is substantially disposed between the force cloth and the frame. The isolator generally includes a sheet of material and a spacer positioned, in proximity to the fastener assembly, between the airbag module and seat frame.

19 Claims, 5 Drawing Sheets

AIRBAG DEPLOYMENT DEVICE

CROSS REFERENCE TO RELATED APPLICATIONS

This application claims the benefit of U.S. Provisional Application No. 60/872,971, filed Dec. 5, 2006, the entire disclosure of the provisional application being considered part of the disclosure of this application and hereby incorporated by reference.

BACKGROUND OF THE INVENTION

1. Technical Field

The present disclosure relates generally to a vehicle seat having an airbag contained therein. More particularly, the present disclosure relates to a deployment device for an airbag in a vehicle seat.

2. Discussion

It is generally known to provide an airbag in a vehicle seat that is configured to deploy and protect an occupant in the event of an accident particularly from an impact to the side of the vehicle. It also known to provide an airbag that deploys through a seam in the trim cover of the vehicle seat. An airbag deployment device in the form of a force concentrator or force cloth may be used to surround the airbag and direct or concentrate the force of the inflating airbag towards an intended "burst" seam and prevent the airbag from expanding underneath the trim cover and/or being applied to the material of the seat trim cover. U.S. Pat. No. 6,045,151, the disclosure of which is incorporated herein, discloses force concentrator sleeves which include a pair of holes for mounting the airbag unit to the vehicle seat frame such that the force concentrator sleeve passes between the airbag unit and the vehicle seat frame.

SUMMARY OF THE INVENTION

In view of the above, the present invention is directed to an airbag system for a vehicle seat. The airbag module is coupled to a vehicle seat frame by a fastener assembly and substantially surrounded by a force cloth for directing the deployment of an airbag contained within the airbag module. An isolator is substantially disposed between the force cloth and the frame. The isolator generally includes a sheet of material, such as plastic or other molded material, that generally follows the profile of the seat frame. The isolator functions to separate the force cloth from the seat frame and is generally used to improve the performance of the airbag system in conjunction with certain seat frames.

The isolator generally may include a spacer having at least three recesses wherein at least two recesses are disposed on one side and at least one recess is disposed on the opposing side to couple the spacer to the sheet of material. The spacer also has a substantially rigid portion between the frame and the airbag module to ensure that the fastener assembly maintains the desired torque and thereby ensure that the airbag module over its life expectancy is securely coupled to the seat frame. The force cloth may then be stitched or otherwise connected to the sheet of material forming the isolator. In some embodiments the spacer may include a groove for receiving the force cloth and the sheet of material forming the isolator.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Before providing the description of the exemplary and alternative embodiments of the track system, it should be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
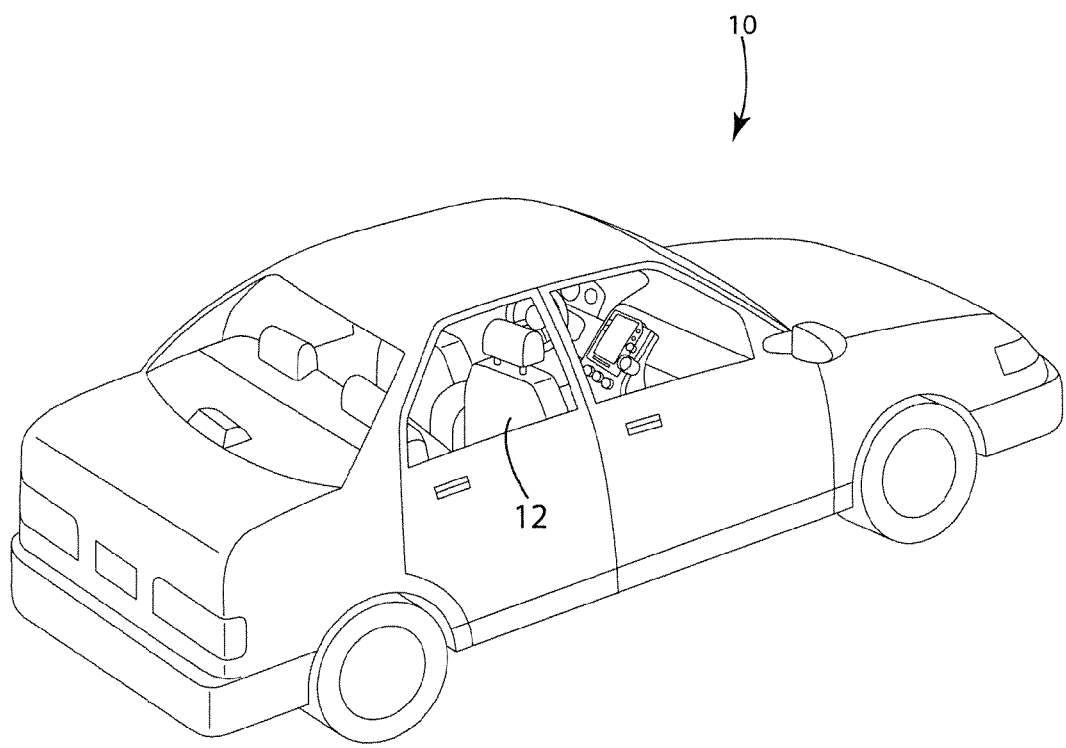
FIG. 1 is an isometric view of a vehicle with a seat including an airbag module according to an exemplary embodiment.
Figure 2:
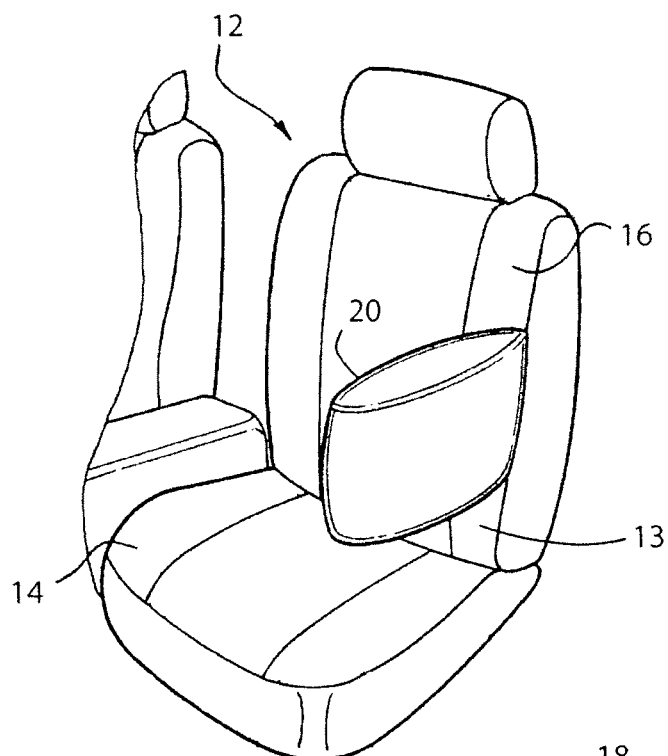
FIG. 2 is an isometric view of the vehicle seat in FIG. 1 showing an airbag deployed through a seam in the cover of the vehicle seat.

Referring to FIG. 1, a vehicle 10 is shown according to an exemplary embodiment. Vehicle 10 includes one or more vehicle seats 12 that are coupled to vehicle 10. As best shown in FIG. 2, vehicle seat 12 includes a generally horizontal lower portion 14 that is coupled to vehicle 10 and an upper or seat back portion 16 that extends upward from the rear end of lower portion 14. At least one of vehicle seats 12 include an airbag module 20 (shown in a deployed configuration) coupled to a frame 18. According to an exemplary embodiment, airbag mechanism 20 is coupled to seat back 16 and is configured to protect an occupant of seat 12 in a side impact. According to other exemplary embodiments, airbag module 20 may be coupled to lower portion 14 to protect occupant of seat 12 in a side impact. According to other exemplary embodiments, airbag module 20 may be coupled to the back of seat back 16 to provide airbag protection for an occupant seated behind seat 12. Although the present invention is illustrated as being used with the front passenger seats of an automobile, it may be used with any seat configuration in any type of vehicle where it is desirable to locate an airbag mechanism within a seat. According to still other exemplary embodiments, airbag module 20 may be located in any suitable location in vehicle 10.

Figure 3:
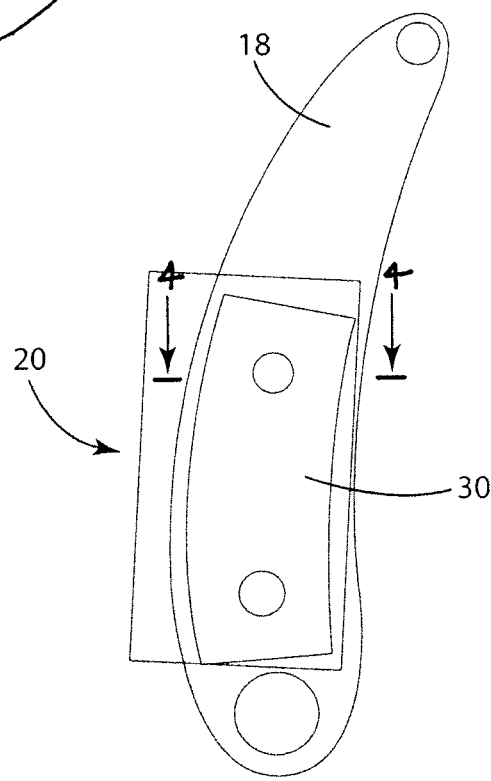
FIG. 3 is side elevation view of a portion of the vehicle seat in FIG. 2 showing a frame member and an airbag coupled to the frame member.
Figure 4:
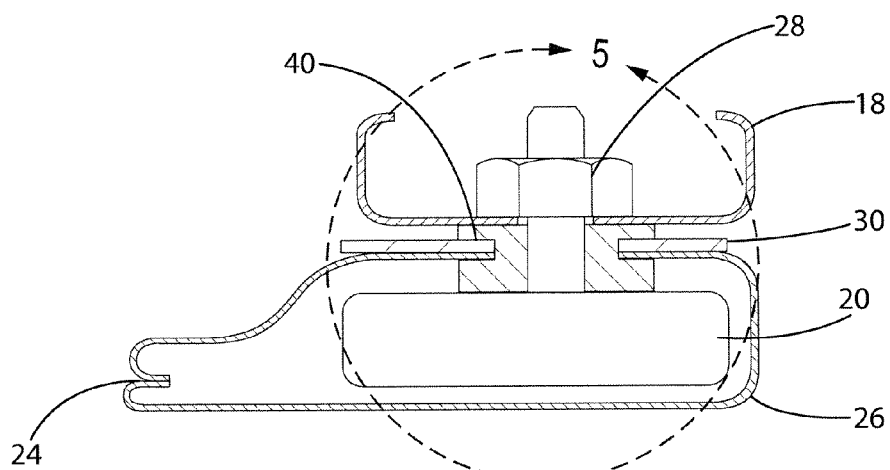
FIG. 4 is a partial cross-section of the vehicle seat in FIG. 3 taken along line 4-4.
Figure 5:
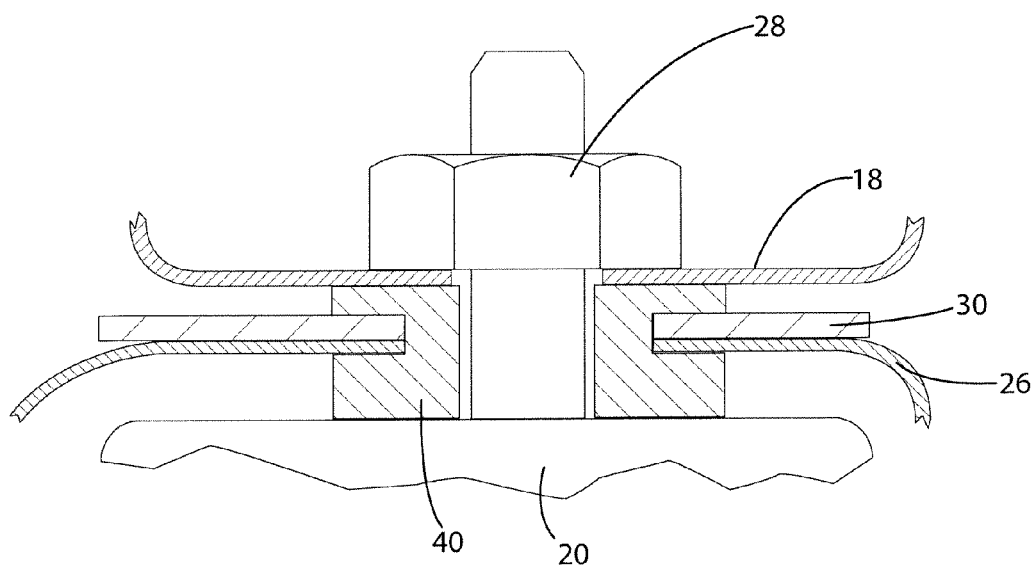
FIG. 5 is a detail cross-section view of the vehicle seat in FIG. 3.

Referring to FIG. 3, a portion of vehicle seat 12 is shown according to an exemplary embodiment without the seat cover 13 or any padding. A frame 18 is provided to support seat back 16. Airbag module 20 is coupled to frame 18 and is configured to deploy through a burst seam in the covering 13 of seat back 16. As shown more clearly in FIGS. 4 and 5, airbag module 20 includes an airbag and an airbag deployment device in the form of a force cloth or force concentrating sleeve. The airbag module 20 may also include a gas generator, control system and other components not shown in the FIGURES. The force cloth 26 (e.g., sleeve, force concentrator, etc.) is provided between the airbag and the cover of seat back 16 and includes a split line 24 that is aligned with a burst seam in the trim cover of the seat back 16. The force cloth 26 of the airbag deployment device is a flexible, non-stretchable material that directs and transmits the force of the deploying airbag to the burst seam in the trim cover of the seat back 16. The airbag therefore ruptures the cover of seat back 16 at a seam instead of at some other point and provides for a more predictable and timely airbag deployment.

According to an exemplary embodiment, airbag module 20 is coupled to frame 18 with a fastener assembly 28, such as the plurality of illustrated threaded studs that extend through or from a portion of frame 18 and attached nuts. The deployment device further includes an isolator 30 formed from a sheet of material and a bushing or spacer 40 that is provided between the airbag module 20 and the frame 18. The spacer 40 includes a central bore (hole, passage) 50 that receives threaded rods from the airbag module 20.

In a first embodiment, the spacer 40 includes a circumferential groove or channel that receives the sheet of material of the isolator 30 and the force cloth 26. The isolator 30 is a generally flat, rectangular or annular body formed from a sheet of plastic or molded material. As illustrated in FIG. 3, the isolator 30 generally includes a profile that matches the profile of the seat frame 18 in the areas proximate the airbag module 20 and force cloth 26. The isolator 30 generally keeps the force cloth 26 separate from the seat frame 18 in an undeployed position as well as during deployment. The isolator 30 may be formed from any suitable material, which generally include most plastics or molded materials. In the preferred embodiment, the isolator 30 is formed from a molded material to allow in molding of the spacer 40. In the embodiment illustrated by FIGS. 4 and 5, the spacer 40 includes a groove and the isolator 30 includes a bore which is at least partially received in the groove of the spacer 40 (i.e., the spacer bushing is attached to the bore (or hole) of the isolator and to the hole of the force cloth). The groove of the spacer 40 holds the isolator and the force cloth together. The isolator may also be coupled to the force cloth with rivets, glue, thread, or any other suitable coupling or fastening method. A nut is threaded onto the threaded portion of the stud to couple the airbag module 20 to the frame member 18 (or the airbag module 20 may be coupled using any other known method or appropriate fastener). The groove is supplied so that the fastener assembly 28 does not lose torque over time, such as when plastic slowly deforms under pressure. The isolator 30 including the spacer 40 provide a barrier between the frame member 18 and the force cloth 26. The isolator 30 with spacer 40 are assembled with the airbag module 20 before the airbag module is coupled to the frame 18 so that there is a tight joint between the airbag module 20 and the frame 18 when the nut is threaded onto the stud.

While the frame 18 is shown as a relatively flat C-shaped cross-section member, it should be understood that the deployment device (including the bushing and isolator) may be used with any type of seat frame including a tubular frame. Further, this arrangement allows for the trim cover and deployment device to be manufactured and shipped as a unit to a vehicle seat just-in-time facility where the trim cover including the deployment device can be assembled to the vehicle seat. Once assembled, the complete vehicle seat 12 including the trim cover 13, airbag module 20 and deployment device can be shipped to the vehicle manufacturer's vehicle assembly plant.

Figure 8:
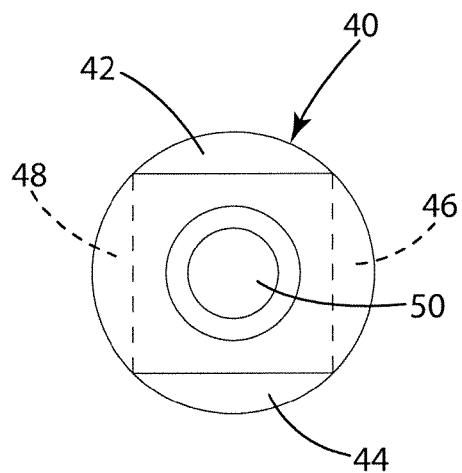
FIG. 8 is a side elevational view of the spacer.
Figure 9:
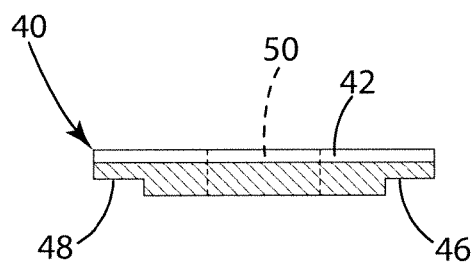
FIG. 9 is a top plan view of the spacer.
Figure 10:
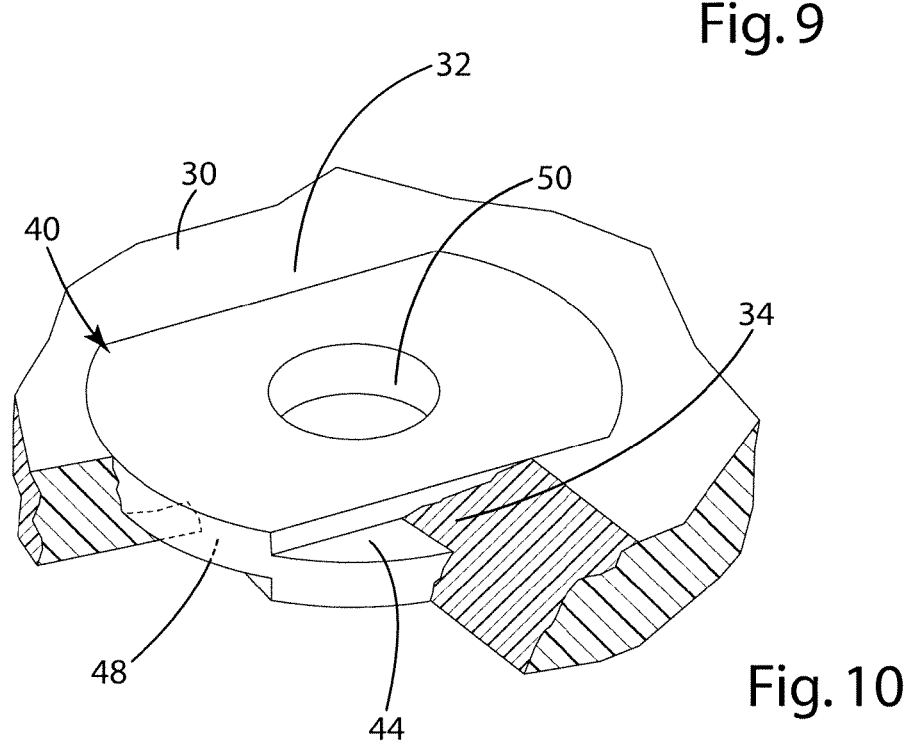
FIG. 10 is a partial sectional view in perspective of the isolator in FIG. 6.

As further illustrated in FIGS. 6-9, the isolator 30 may include an in-molded spacer 40. The isolator 30 is still formed from a molded material, but two spacers 40 are included in the molding process to allow for easier assembly and lower production costs. As illustrated in detail in FIGS. 8 and 9, the isolator includes a plurality of recesses into which the molded material may flow during the molding process. As shown in FIGS. 8 and 9, the spacer includes a first set of opposed recesses on a first surface, in particular a first recess 42 and a second recess 44. The opposite surface of the spacer 40 includes two more opposing recesses, in particular third and fourth recesses 46 and 48 offset ninety degrees from the first and second recesses. The spacer 40 including recesses may be formed by any production method. One such production method is taking a standard washer of desired size and grinding the recesses into the surfaces. It should be recognized that the isolator 30 may securely hold a spacer 40 having three or more total recesses. A spacer 40 having two recesses on a first surface and a third recess on the opposing surface where the recesses substantially do not overlap or where the recesses are approximately positioned on the corners of a triangle may be securely retained within the sheet of material. Of course, additional recesses may further be used.

Figure 6:
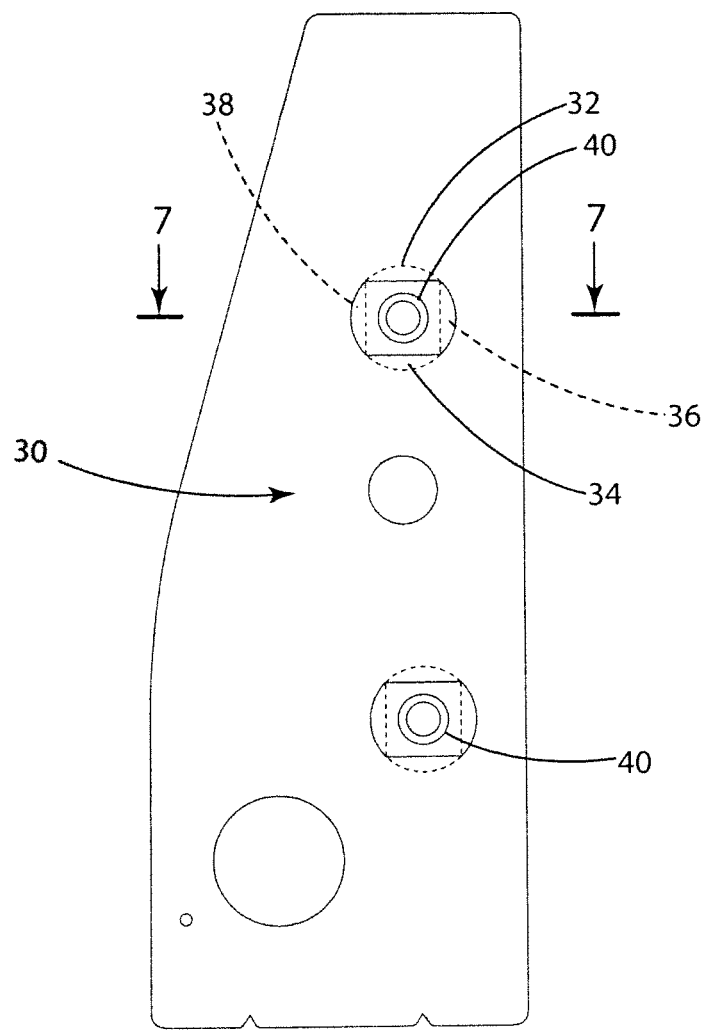
FIG. 6 is a side elevational view of an isolator and spacer.
Figure 7:
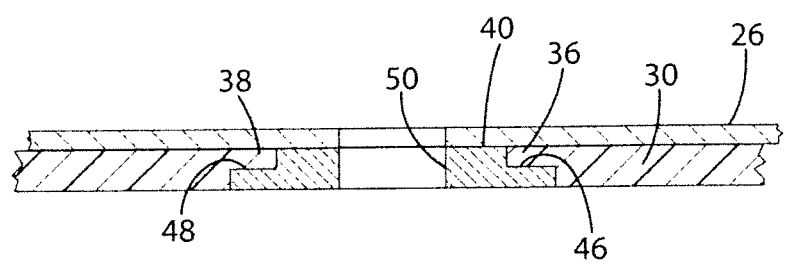
FIG. 7 is a partial cross-sectional view of the isolator in FIG. 6 taken along line 7-7.

The spacers 40 are inserted into a mold to be formed with the molded sheet forming the isolator 30. The molding material flows into the recesses to form first, second, third and fourth molded fill areas, 32, 34, 36, and 38 respectively, as illustrated in FIG. 6. The spacer 40 and molded sheet of the isolator 30 may be configured to form a substantially planar surface. The spacer 40 is also generally formed to allow the frame 18 and airbag module 20 to engage opposing areas with no intervening molded material, such that when the airbag module 20 is attached to the frame 18 with the fastener assembly 28, the fastener assembly 28 does not lose torque over time. This engagement may be clearly seen in FIG. 7.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An airbag system comprising:
   a seat frame;
   an airbag module;
   a fastener assembly coupling said airbag module to said seat frame;
   a force cloth surrounding said airbag module;
   an isolator disposed between said frame and said airbag module and isolating said frame from said airbag module and said force cloth;

said isolator including at least one spacer disposed between said seat frame and said airbag module and a sheet mechanically locked to said spacer to prevent movement therebetween for isolating said force cloth from said frame; and said sheet of said isolator being directly attached with said force cloth separate from said fastener assembly.

2. The airbag system of claim 1 wherein said seat frame has a first profile and wherein said isolator has a second profile substantially matching said first profile proximate to said airbag module and said force cloth.

3. The airbag system of claim 1 wherein said force cloth is directly coupled to said spacer.

4. The airbag system of claim 3 wherein said spacer is in-molded with said sheet.

5. The airbag system of claim 3 wherein said spacer includes a groove and wherein at least one of said isolator and said force cloth is disposed within said groove.

6. The airbag system of claim 5 wherein said isolator is attached to said spacer with said groove and said force cloth is stitched to said isolator.

7. The airbag system of claim 5 wherein said groove has a thickness and is configured to receive both said isolator and said spacer and wherein said airbag module is securely coupled to said frame without changing the thickness of said groove.

8. The airbag system of claim 1 wherein said force cloth is stitched to said sheet.

9. The airbag system of claim 1 wherein said force cloth is adhesively attached to said sheet.

10. The airbag system of claim 1 wherein said spacer has two opposing sides and wherein each side includes at least two recessed portions wherein said recessed portions on said first side are approximately ninety degrees opposed to said recessed portions on said second side for mechanically locking said spacer to said sheet to prevent movement therebetween.

11. The airbag system of claim 10 wherein said sheet is formed from a molded material and wherein said molded material substantially fills said recesses.

12. The airbag system of claim 11 wherein the surfaces directly opposite on the opposing side are substantially free of said molded material.

13. The airbag system of claim 1 wherein said isolator includes a spacer includes at least three recesses arranged in a substantially triangular pattern and wherein said recesses are substantially free of overlap.

14. The airbag system of claim 1 wherein said isolator includes at least two spacers having at least two approximately opposing recesses on a first surface and at least two opposing recesses on a second surface and wherein said recesses on said first surface are substantially free from overlapping said recesses on said second surface.

15. A side airbag system for a seat having a seat back, said side airbag system comprising:
   a seat back frame for said seat back;
   a fastener assembly;
   an airbag module coupled to said seat back frame with said fastener assembly;
   an isolator having a molded sheet and at least two spacers mechanically locked to said molded sheet, said spacers being disposed between said seat back frame and said airbag module;
   a force cloth surrounding said airbag module and wherein said isolator is configured to substantially isolate said seat frame from said force cloth; and
   said molded sheet of said isolator being directly attached with said force cloth separate from said fastener assembly.

16. The side airbag system of claim 15 wherein said spacer includes at least two approximately opposing recesses on a first surface and at least two opposing recesses on a second surface.

17. The side airbag of claim 16 wherein said molded sheet substantially fills said recesses.

18. The side airbag of claim 15 wherein said spacer includes a groove receiving said molded sheet and said force cloth.

19. An airbag system comprising:
   a seat frame;
   a fastener assembly for coupling an airbag module to said seat frame;
   an isolator having a molded sheet and at least two spacers coupled to said molded sheet, said spacers being disposed between said seat back frame and said airbag module, said spacers having at least two recesses on a first surface and at least one recess on a second surface and wherein said recesses on said first surface are substantially free from overlapping said at least one recess on said second surface; and
   a force cloth directly coupled to said molded sheet and wherein said force cloth encloses said airbag module.

* * * * *